June 21, 1938.     O. M. MILLER     2,121,255
MIRROR SUITABLE FOR MAP PLOTTING DEVICES
Filed Aug. 8, 1935
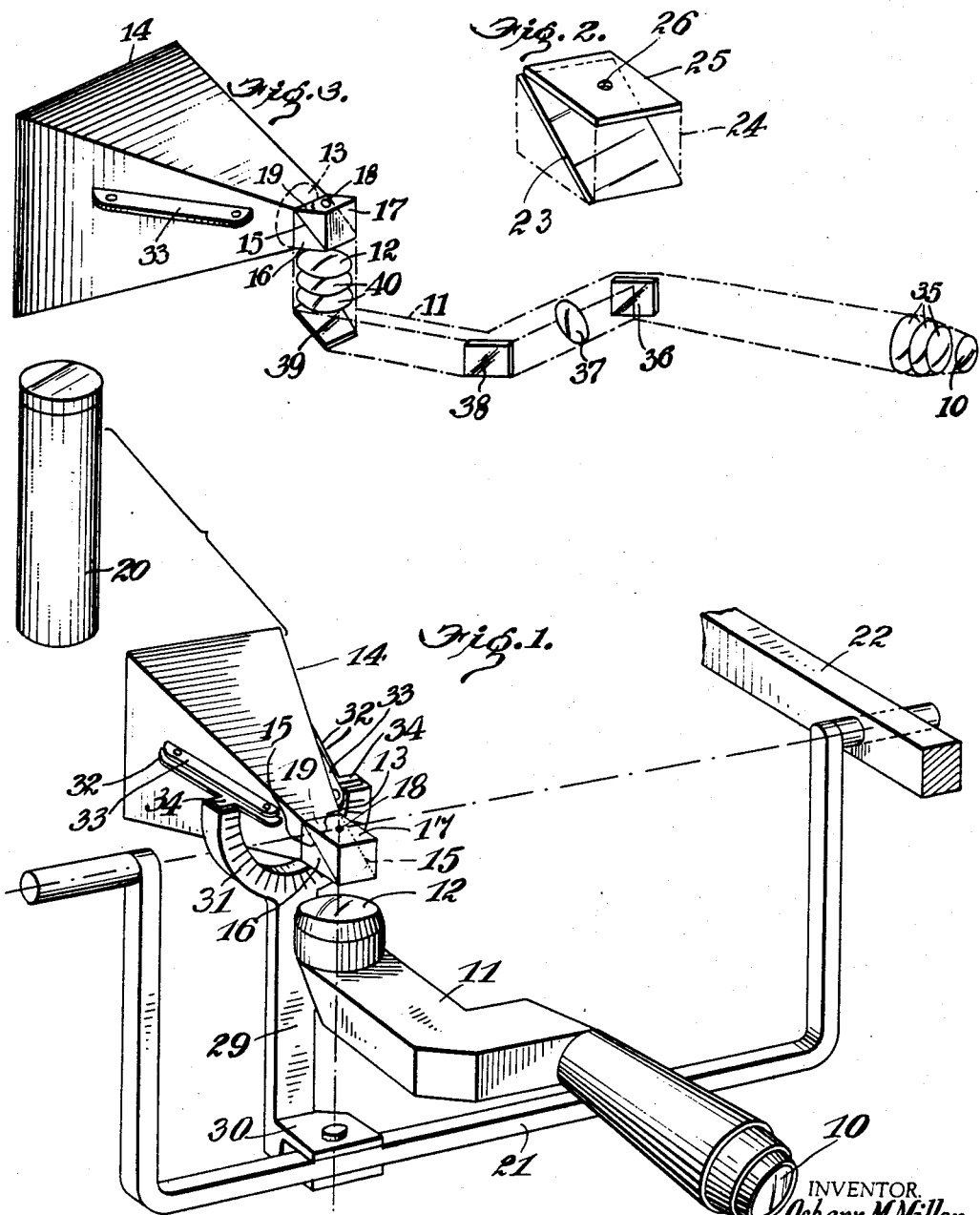
INVENTOR.
Osborn M. Miller
BY
his ATTORNEY.

Patented June 21, 1938

2,121,255

UNITED STATES PATENT OFFICE 2,121,255

MIRROR SUITABLE FOR MAP PLOTTING DEVICES

Osborn M. Miller, New York, N. Y., assignor of one-half to American Geographical Society, New York, N. Y., a corporation of New York Application August 8, 1935, Serial No. 35,251

2 Claims. (Cl. 88—29)

This invention relates to mirrors suitable for map plotting devices and is herein disclosed in some detail as embodied in a slightly modified form of the device of my Patent No. 1,985,260, issued December 25, 1934.

In that device a photograph is shown as set up in a plate-holder and viewed from an eye piece through an optical system including an inclined mirror pierced by a pinhole,—an illuminated index point being viewed in sharp focus through the pin hole.

That optical system is found very satisfactory for scanning in map making a large part of a photograph set up in the plate holder, but in viewing certain parts of the field of the photograph the index mark is viewed at one side of the pinhole with the result that the pinhole is seen decidedly obliquely, and diffraction effects interfere with the sharpness of focus of the index mark.

According to the present invention these and other difficulties are overcome by substituting, for the completely reflecting mirror of that patented structure, an incompletely reflecting surface and placing the pinhole behind the mirror usually in an opaque screen or diaphragm which is normal to the optical axis of the viewing apparatus.

In the form disclosed the incompletely reflecting mirror may be set at any desired angle to the optical axis, an angle of 45° not always being most efficient, while the pinhole is behind the mirror and is seen with minimum distortion.

Other features and advantages will hereinafter appear.

In the accompanying drawing,

Figure 1 is a fragmentary perspective view of one form of the invention as embodied in a device of said patent.

Figure 2 shows a modified mirror.

Figure 3 is a diagrammatic showing of one suitable system of lenses.

The eyepiece 10, corresponding to the eyepiece 45 of said patent, is shown as part of an optical system lying within the casing 11, and identical with the optical system of the patent up to and including the objective lens 12, shown near the small end 13 of the plate holder casing 14.

The present invention includes a device serving as a mirror 15, which may be set at an angle of 45°, like the mirror 47 of said patent, but the mirror shown in Figure 1 of the present invention is part of a glass cube formed of two right prisms 16 and 17, cemented together on their diagonal faces 15 by Canada balsam. Such a mirror forms a very satisfactory reflector, the very thin layer of the balsam permitting the true glass face 15 of the mirror 16 to reflect images with almost perfect accuracy. The reflection, however, is not complete, and an eye at the eyepiece 10 not only sees in the mirror any photograph in the plate holder 14, but also sees light passing through a pin hole 18 in an opaque screen or mask or diaphragm 19 on the flat upper face of the prism 17, and through the pinhole sees the illuminated index mark (not shown) on the index mark support 20. The pinhole may be of any desired shape. Under some conditions a square hole is preferable to a round one.

In order to preserve the needed optical relationship of parts, the bail 21, is journalled to swing in the frame 22, so that the axis on which it swings passes through the pinhole 18.

As a result the pinhole always remains at the perspective center of the optical system, and the index mark is seen at the least distorted position and in clear focus at any depth of focus, the optical system in the casing 11 bringing the virtual eye to the pinhole, which as just stated is the perspective center.

Figure 2 shows an alternative form of mirror 23, shown as diagonally crossing a rectangular casing 24, the casing having an opaque top 25, pierced with a pinhole 26. In this form the mirror shown is a "half-silvered" mirror, or a surface silvered so that some of the light passes through it, with the result that the index mark is visible through the pinhole 26 in the opaque top or diaphragm 25.

One advantage of this form of pinhole and mirror is the wide range of useful angles at which the mirror 23 may be set to yield the most satisfactory image at the eyepiece 10.

The structure of Figure 2 is set like the structure of Figure 1, with the axis of swing of the bail 21 lying in the pinhole 26.

The plateholder 14 is shown as turnable on the pinhole 18 as perspective center, being for this purpose carried on a vertical standard 29 having a horizontal arm 30 journalled on the bail 21 at the foot of the perpendicular from the pinhole to the bail. The plateholder 14 is shown as rotatable in an arcuate segment 31 whose axis passes through the pinhole, said segment 31 serving as a slide for an arcuate carrier 32 which carries the plateholder 14 by brackets 33 having lugs 34 which are fastened to the ends of the carrier 32.

The lens system shown includes the eyepiece 10, a group of lenses 35 which direct the rays of light coming from a mirror 36, which receives them from a single lens 37. The rays of light come to the lens 37 from a mirror 38 which receives them from a mirror 39. The rays of light come to the mirror 39 from the mirror 15 through another group of lenses 40 ending with the lens 12. Thus the whole lens system is adapted to form one part of a stereoscopic viewing set.

In the best form, herein illustrated, the mirror 15 moves as a unit with the plateholder, thus simplifying the setting of a new photograph in the plateholder.

Having thus described certain embodiments of the invention, what is claimed is:

1. In a viewing apparatus for a plotting device the combination with an index mount providing a beam of light, of a plate holder for a plate providing a second beam of light, a partially-reflecting mirror in the path of the first beam and set at an angle to the second beam to deflect by reflection the second beam into the path of the first beam, a screen across the first beam between the index mount and mirror and provided with a pinhole to pass a pencil of light of the first beam to merge with the deflected second beam, an eye piece into which the merged beams pass, and lenses between the eyepiece and mirror serving to bring the virtual eye viewing the beam from the eye piece to the pinhole.

2. In a viewing apparatus for a plotting device the combination with an index mount providing a beam of light, of a plate holder for a plate providing a second beam of light, a partially-reflecting mirror in the path of the first beam and set at an angle to the second beam to deflect by reflection the second beam into the path of the first beam, a screen across the first beam between the index mount and mirror and provided with a pinhole to pass a pencil of light of the first beam to merge with the deflected second beam, an eye piece into which the merged beams pass, lenses between the eye piece and mirror serving to bring the virtual eye viewing the beam from the eye piece to the pinhole, and supporting means for the plate holder on which the plate holder may be rotated, or tilted or swung, said means holding the plate in the plate holder so that the pinhole serves as its perspective center.

OSBORN M. MILLER.